US012658770B2

(12) United States Patent   (10) Patent No.: US 12,658,770 B2
Liu et al.   (45) Date of Patent: Jun. 16, 2026

(54) MOTOR CONTROLLER, DRIVE SYSTEM, POWER SUPPLY SYSTEM, AND ELECTRIC DEVICE

(71) Applicant: Contemporary Amperex Technology Co., Limited, Ningde (CN)

(72) Inventors: Tian Liu, Ningde (CN); Yu Yan, Ningde (CN); Diping Liu, Ningde (CN); Chunfa Wang, Ningde (CN); Yifei Huang, Ningde (CN); Pengfei Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/298,245

(22) Filed: Aug. 13, 2025

(65) Prior Publication Data

US 2025/0373126 A1    Dec. 4, 2025

Related U.S. Application Data

(63) Continuation of application No. PCT/CN2023/133015, filed on Nov. 21, 2023.

(30) Foreign Application Priority Data

Mar. 16, 2023   (CN) .......................... 202320516812.6

(51) Int. Cl.
*H02K 11/33*     (2016.01)
*H02K 5/20*     (2006.01)
*H02K 11/01*     (2016.01)
(52) U.S. Cl.
CPC ............. *H02K 11/33* (2016.01); *H02K 5/203* (2021.01); *H02K 11/0141* (2020.08); *H02K 2211/03* (2013.01)

(58) Field of Classification Search
CPC ...... H02K 11/00; H02K 11/01; H02K 11/014; H02K 11/0141; H02K 11/33; H02K 5/00; H02K 5/20; H02K 5/203; H02K 2211/03
See application file for complete search history.

(56) References Cited

U.S. PATENT DOCUMENTS

2018/0367723 A1* 12/2018 Nie ...................... H04N 23/957

FOREIGN PATENT DOCUMENTS

CN      207150232 U   *   3/2018
CN      111347924 A       6/2020
(Continued)

OTHER PUBLICATIONS

International Search Report and Written Opinion mailed on Jan. 15, 2024, received for PCT Application PCT/CN2023/133015, filed on Nov. 21, 2023, 15 pages including English Translation.
(Continued)

*Primary Examiner* — Tran N Nguyen
(74) *Attorney, Agent, or Firm* — XSENSUS LLP

(57) ABSTRACT

A motor controller includes: a plurality of first power modules, a second power module, a first group of connecting interfaces, a second group of connecting interfaces, and a first capacitor, where the plurality of first power modules are connected in parallel to each other, and the plurality of first power modules are configured to connect to the first group of connecting interfaces; the second power module is configured to connect to the second group of connecting interfaces; and the first capacitor is connected in parallel to the second power module, where the plurality of first power modules and the second power module are configured to perform temperature regulation on an object connected to the first group of connecting interfaces and the second group of connecting interfaces.

14 Claims, 6 Drawing Sheets

(56)     References Cited

FOREIGN PATENT DOCUMENTS

| | | | | |
|---|---|---|---|---|
| CN | 112977171 | A | | 6/2021 |
| CN | 114126264 | A | | 3/2022 |
| CN | 114389408 | A | * | 4/2022 |
| CN | 114523854 | A | | 5/2022 |
| CN | 115377557 | A | | 11/2022 |
| CN | 115378064 | A | | 11/2022 |
| CN | 217824785 | U | | 11/2022 |
| CN | 217824786 | U | | 11/2022 |
| CN | 219643815 | U | | 9/2023 |
| JP | 6053896 | B1 | * | 12/2016 ............. H02K 11/33 |

OTHER PUBLICATIONS

Notification of Grant mailed on Jun. 13, 2023, received for CN Application 202320516812.6, 3 pages including English Translation.
Extended European Search Report issued Mar. 17, 2026 in European Patent Application No. 23927155.4.

* cited by examiner

MOTOR CONTROLLER, DRIVE SYSTEM, POWER SUPPLY SYSTEM, AND ELECTRIC DEVICE

CROSS-REFERENCE TO RELATED APPLICATIONS

This application is a bypass continuation application of international application No. PCT/CN2023/133015 having an international filing date of Nov. 21, 2023, which claims priority to Chinese Patent Application No. 202320516812.6, filed with the China National Intellectual Property Administration on Mar. 16, 2023 and entitled "MOTOR CONTROLLER, DRIVE SYSTEM, POWER SUPPLY SYSTEM, AND ELECTRIC DEVICE", each are incorporated herein by reference in its entirety.

TECHNICAL FIELD

This application relates to the field of motor control technologies, and specifically, to a motor controller, a drive system, a power supply system, and an electric device.

BACKGROUND

Currently, self-heating of a battery has the technical problems of a low heating rate, loud motor noise, and a large heat loss. The reasons of the foregoing problems include that existence of a large eddy current loss in a circuit causes a large heat loss of a motor.

SUMMARY

An objective of this application is to provide a motor controller, a drive system, a power supply system, and an electric device, to alleviate a problem of a large eddy current loss existing in a heating process of a motor.

According to a first aspect, this application provides a motor controller, including: a plurality of first power modules, a second power module, a first group of connecting interfaces, a second group of connecting interfaces, and a first capacitor, where the plurality of first power modules are connected in parallel to each other, and the plurality of first power modules are configured to connect to the first group of connecting interfaces; the second power module is configured to connect to the second group of connecting interfaces; and the first capacitor is connected in parallel to the second power module, where the plurality of first power modules and the second power module are configured to perform temperature regulation on an object connected to the first group of connecting interfaces and the second group of connecting interfaces.

In an optional implementation, a plurality of first current sensors and a second current sensor are further included, where the first current sensors are connected to output ends of the first power modules; and the second current sensor is connected to an output end of the second power module.

In the foregoing implementation, by matching current sensors for power modules, current statuses of the power modules during operation can be detected by using the current sensors, to better pay attention to operation of the motor controller.

In an optional implementation, a plurality of first drive boards and a second drive board are further included, where each of the first drive boards is connected to one of the first power modules; and the second drive board is connected to the second power module.

In an optional implementation, a switch is further included, where two ends of the switch are respectively connected to a first end of the first group of connecting interfaces and a first end of the second group of connecting interfaces, where when the switch is in a closed state, the second power module and the plurality of first power modules are in a parallel-connected state.

In the foregoing implementation, a non-parallel-connected state between the second power module and the plurality of first power modules is implemented by opening the switch, so that a connected object can be heated through two branches. Alternatively, a parallel-connected state between the second power module and the plurality of first power modules is implemented by closing the switch, so that a connected object can be heated through a single branch. Therefore, the motor controller can be better adapted to requirements of different scenarios.

In an optional implementation, an electric connector that is detachably installed on a first end of the first group of connecting interfaces and that is connected to a first end of the second group of connecting interfaces is further included.

In the foregoing implementation, switching between a non-parallel-connected state and a parallel-connected state between the second power module and the plurality of first power modules may be implemented by arranging an electric connector detachably, so that a connected object can be heated through a single branch or two branches, and the motor controller can be better adapted to requirements of different scenarios.

In an optional implementation, the motor controller includes three of the first power modules, where three plurality of first power modules are respectively configured to connect to a three-phase line of a motor; and the second power module is configured to connect to a neutral line of the motor.

In an optional implementation, a second capacitor connected in parallel to the first power modules is further included.

In an optional implementation, a box body is further included, where the box body is configured to accommodate the plurality of first power modules, the second power module, and the first capacitor; and the first group of connecting interfaces and the second group of connecting interfaces are arranged on a side surface of the box body.

In an optional implementation, the box body is provided with a coolant outlet, a coolant inlet, and a coolant channel communicating the coolant outlet with the coolant inlet, where the first power modules and the second power module are configured to perform heat exchange with a coolant in the coolant channel.

In the foregoing implementation, by arranging the coolant channel between the coolant outlet and the coolant inlet, the first power modules and the second power module may exchange heat with the coolant in the coolant channel, so that a heat dissipation effect of the motor controller is improved.

In an optional implementation, a third group of connecting interfaces, arranged on a side surface of the box body, are further included, where the third group of connecting interfaces are connected to the plurality of first power modules and the second power module; and the third group of connecting interfaces are configured to connect to the motor.

In an optional implementation, the first group of connecting interfaces, the second group of connecting interfaces, and the third group of connecting interfaces are arranged on a same side surface of the box body.

In an optional implementation, a box cover matching the box body and snap-fitted onto the box body is further included, where an electromagnetic shielding seal gasket is arranged at a position at which the box body and the box cover are snap-fitted.

In the foregoing implementation, by arranging the electromagnetic shielding seal gasket at the position at which the box body and the box cover are snap-fitted, the electromagnetic shielding seal gasket can further improve electromagnetic compatibility of the motor controller while satisfying waterproofing performance requirements.

According to a second aspect, this application provides a drive system, including a motor and the motor controller according to any one of the foregoing implementations.

According to a third aspect, this application provides a power supply system, including a battery and the drive system according to the foregoing implementations.

According to a fourth aspect, this application provides an electric device, including the power supply system according to the foregoing implementations.

Beneficial effects of the embodiments of this application are: By arranging a first capacitor, the first capacitor is connected in parallel to the second power module, to achieve voltage stabilization, and absorb a ripple current under a heating condition, thereby alleviating a large eddy current loss existing during heating of the motor, and reducing a heat loss of the motor.

BRIEF DESCRIPTION OF THE DRAWINGS

To illustrate the technical solutions of embodiments of this application more clearly, the following briefly introduces the accompanying drawings required in embodiments of this application. Obviously, the accompanying drawings described below are only some embodiments of this application. For a person of ordinary skill in the art, other drawings can also be obtained according to the drawings without any creative work.

Figures 1, 2:
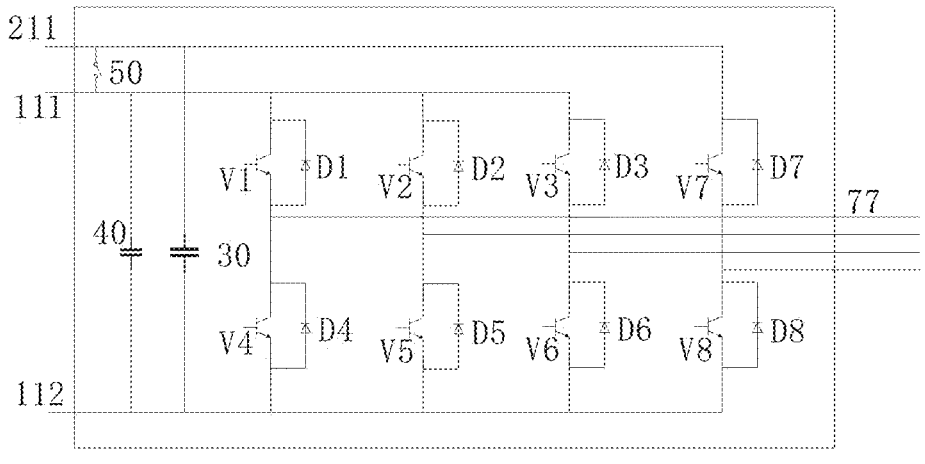
FIG. 1 is a schematic diagram of a circuit structure of a motor controller according to an embodiment of this application.
FIG. 2 is a schematic diagram of a circuit structure on which a motor controller and a motor are cooperatively installed according to an embodiment of this application.

Reference signs: 10—first power module; 20—second power module; 11—first group of connecting interfaces; 111—first positive electrode interface; 112—first negative electrode interface; 21—second group of connecting interfaces; 211—second positive electrode interface; 213—second positive-electrode output electric connector; 12—first current sensor; 22—second current sensor; 23—module input electric connector; 13—first drive board; 24—second drive board; 30—first capacitor; 40—second capacitor; 50—switch; 60—electric connector; 70—box body; 71—coolant outlet; 72—coolant inlet; 73—coolant channel; 74—explosion-proof valve; 75—low-pressure interface; 76—connecting portion; 77—motor interface; D1—first diode; V1—first triode; D2—second diode; V2—second triode; D3—third diode; V3—third triode; D4—fourth diode; V4—fourth triode; D5—fifth diode; V5—fifth triode; D6—sixth diode; V6—sixth triode; D7—seventh diode; V7—seventh triode; D8—eighth diode; V8—eighth triode; 80—third group of connecting interfaces; 90—motor.

DETAILED DESCRIPTION

The embodiments of the technical solutions of the present application need to be described in detail below with reference to the accompanying drawings. The following embodiments are only used to illustrate the technical solutions of the present application more clearly, and are therefore only used as examples, and cannot be used to limit the protection scope of the present application.

Unless otherwise defined, all technical and scientific terms used herein have the same meanings as commonly understood by a person skilled in the art to which the present disclosure belongs. The terms used herein are merely for the purpose of describing specific embodiments, but are not intended to limit the present application. The terms "include", "have" and any other variants in the specification, claims, and description of accompanying drawings of this application mean to cover the non-exclusive inclusion.

In the description of the embodiments of this application, the technical terms "first" and "second" are merely intended to distinguish between different items but not intended to indicate or imply relative importance or implicitly specify the number of the indicated technical features, specific order, or order of precedence. In the description of the embodiments of this application, unless otherwise expressly specified, "a plurality of" means two or more.

An "embodiment" mentioned in this specification means that a particular feature, structure, or characteristic described with reference to this embodiment may be included in at least one embodiment of this application. The phrase appearing at various positions in this specification may neither necessarily mean a same embodiment, nor mean an independent or optional embodiment exclusive from another embodiment. It is explicitly and implicitly understood by a person skilled in the art that embodiments described in the specification may be combined with another embodiment.

In the descriptions of embodiments of this application, the term "and/or" in this application describes only an association relationship for describing associated objects and represents that three relationships may be present. For example, A and/or B may represent the presence of the three cases: A alone, both A and B, and B alone. In addition, the character "/" in this specification generally indicates an "or" relationship between the associated objects.

In the description of embodiments of this application, the term "a plurality of" means two or more (including two). Similarly, "a plurality of groups" means two or more groups (including two groups), and "a plurality of pieces" means two or more pieces (including two pieces).

In the description of the embodiments of the present application, orientations or positional relationships indicated by technical terms "center", "longitudinal", "lateral", "length", "width", "thickness", "upper", "lower", "front", "rear", "left", "right", "vertical" "horizontal", "top", "bottom", "inner", "outer", "clockwise", "counterclockwise", "axial", "radial", "circumferential", or the like are based on orientations or positional relationships shown in the drawings, and are only for the convenience of describing the embodiments of the present application and simplifying the description, and do not indicate or imply that a device or element referred to needs to have a specific orientation, be constructed and operated in a specific orientation, and therefore cannot be understood as limitations to the embodiments of the present application.

In the description of the embodiments of the present application, unless otherwise explicitly specified and defined, the technical terms such as "install", "couple", "connect", and "fix" should be understood in a broad sense, for example, they may be a fixed connection, a detachable connection, or an integrated connection; may be a mechanical connection or an electric connection; or may be a mechanical connection or an electrical connection; or may be a direct connection, an indirect connection through an intermediate, or internal communication between two elements or an interaction relationship between two elements. A person of ordinary skill in the art may understand the specific meanings of the foregoing terms in the embodiments of this application according to specific situations.

At present, from the perspective of market development, application of power batteries becomes increasingly extensive. Power batteries are not only used in energy storage power systems such as hydro, thermal, wind, and solar power stations, but also widely used in electric means of transport such as electric bicycles, electric motorcycles, and electric vehicles, and used in many other fields such as military equipment and aerospace. With continuously increasing application of the power batteries, the market demand is also constantly expanding.

However, in a low-temperature environment, a discharge capacity of a battery seriously declines and cannot be charged. Currently, to improve adaptability of an electric vehicle in a cold region, self-heating of a power battery is configured. An existing self-heating technical solution for a battery may be to excite the battery by using a motor controller and a motor to generate a positive and negative alternating current, which not only improves an operating temperature of the power battery, but also can better exert performance of the battery, and also achieves battery heating using electric control of a motor of an electric vehicle, thereby reducing costs.

Currently, such a battery heating technology has the technical problems such as a low heating rate, loud motor noise, and a large heat loss. The reason of the foregoing problems is that self-heating of the battery is implemented by changing an algorithm, resulting in low heating efficiency. However, an effect of reducing motor noise by using a random frequency conversion policy is not obvious. Existence of a large eddy current loss in a control circuit of a motor causes a large heat loss of the motor.

To alleviate the problem that existence of a large eddy current loss in a control circuit of a motor causes a large heat loss of the motor, a voltage stabilization capacitor is added to alleviate the problem that existence of a large eddy current loss in a control circuit of a motor causes a large heat loss of the motor.

The battery, the motor, and the motor controller disclosed in the embodiments of this application may be used without limitation in electric devices such as vehicles, ships, or aircrafts.

The embodiment of the present application provides an electrical device using a battery as a power supply, which can be but is not limited to mobile phones, tablet computers, laptops, electric toys, electric tools, electric bicycles, electric vehicles, ships, spacecraft, and so on. The electric toy may include a stationary or mobile electric toy, such as a game console, an electric car toy, an electric ship toy, an electric airplane toy and the like. The spacecraft may include an airplane, a rocket, a space shuttle, and a spaceship.

For the convenience of explanation, the following embodiment takes an electrical device in one embodiment of the present application being the vehicle as an example to explain.

The vehicle may be an oil-fueled vehicle, a gas-powered vehicle, or a new energy vehicle. The new energy vehicle may be a battery electric vehicle, a hybrid electric vehicle, an extended-range electric vehicle, or the like. A battery is arranged inside the vehicle, and the battery may be arranged at the bottom, the head, or the tail of the vehicle. The battery may be configured to supply power to the vehicle. For example, the battery may be used as an operational power supply for the vehicle. The vehicle may also include a controller and a motor, and the controller is configured to control the battery to supply power to the motor, for example, for operating power demands while the vehicle is starting, navigating, and driving.

In this embodiment, as shown in FIG. 2, the vehicle further includes a motor and a motor controller. The motor and the motor controller can heat the battery.

In some embodiments of the present application, the battery not only may be used as the operating power supply of the vehicle, but also may be used as a driving power supply of the vehicle to provide driving power for the vehicle instead of or partially instead of fuel or natural gas.

Referring to FIG. 1, an embodiment of this application provides a motor controller. The motor controller may include a plurality of first power modules 10, a second power module 20, a first group of connecting interfaces 11, a second group of connecting interfaces 21, and a first capacitor 30.

The plurality of first power modules 10 are connected in parallel to each other, and the plurality of first power modules 10 are configured to connect to the first group of connecting interfaces 11.

The second power module 20 is configured to connect to the second group of connecting interfaces 21. The first capacitor 30 is connected in parallel to the second power module 20.

In this embodiment, the plurality of first power modules 10 and the second power module 20 are configured to perform temperature regulation on an object connected to the first group of connecting interfaces 11 and the second group of connecting interfaces 21.

For example, an object connected to the first group of connecting interfaces 11 and the second group of connecting interfaces 21 may be a battery.

The first group of connecting interfaces 11 may be configured to connect to a group of batteries, to heat the group of batteries. As shown in FIG. 1, the first group of connecting interfaces 11 may include a first positive electrode interface 111 and a first negative electrode interface 112. The first positive electrode interface 111 is configured to connect to a positive electrode of the battery, and the first negative electrode interface 112 is configured to connect a negative electrode of the battery. The second group of connecting interfaces 21 may be configured to connect to another group of batteries, to heat the group of batteries. The second group of connecting interfaces 21 may include a second positive electrode interface 211 and a second negative electrode interface (not signed in the figure). The second positive electrode interface 211 is configured to connect to a positive electrode of the battery, and the second negative electrode interface is configured to connect a negative electrode of the battery. In the embodiment shown in FIG. 1, the second negative electrode interface and the first positive electrode interface 111 are located at a same position. Optionally, power modules of the motor controller may be connected to a motor 90. For example, through the motor controller and the motor 90 connected to the motor controller, the battery may be excited to generate a positive and negative alternating current, thereby improving an operating temperature of the power battery.

In the embodiment shown in FIG. 1, each first power module 10 may include two power subunits. The two power subunits may be connected in series. Each power subunit includes a diode and a triode, where two ends of the diode are respectively connected between a collector and an emitter of the triode.

In the embodiment shown in FIG. 1, the motor controller may include three first power modules 10. The three first power modules 10 may be connected to each other in parallel.

The three first power modules 10 may be connected to a three-phase line of a motor connected to the motor controller, and the second power module 20 may be connected to a neutral line of the motor connected to the motor controller.

Figure 4:
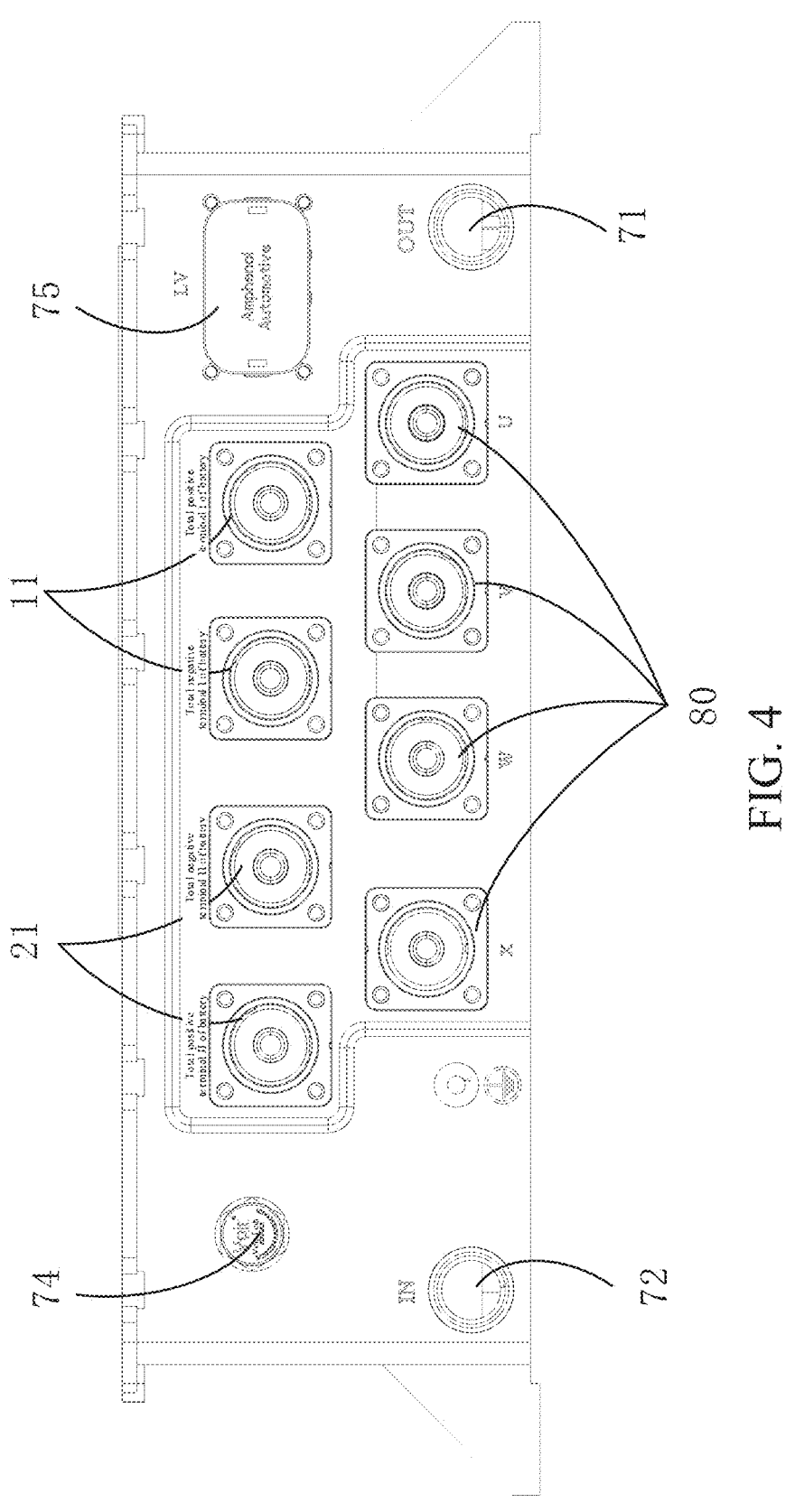
FIG. 4 is a schematic diagram of another circuit structure of a motor controller according to an embodiment of this application.

For example, as shown in FIG. 4, a motor interface 77 may be arranged on the box body 70, and the motor controller is connected to the motor by the motor interface 77. The motor interface 77 includes four interfaces, where the three interfaces communicate with the three first power modules 10, and are configured to connect a three-phase line of the motor. The other interface communicates with the second power module 20, and is configured to connect to a neutral line of the motor.

The three first power modules 10 each include two power subunits, and the three first power modules 10 respectively include a first power subunit to a sixth power subunit. The first power subunit includes: a first diode D1 and a first triode V1. The second power subunit includes: a second diode D2 and a second triode V2. The third power subunit includes a third diode D3 and a third triode V3. The fourth power subunit includes a fourth diode D4 and a fourth triode V4. The fifth power subunit includes a fifth diode D5 and a fifth triode V5. The sixth power subunit includes a sixth diode D6 and a sixth triode V6.

As shown in FIG. 2, a connecting point of a three-phase line of the motor 90 connected to the electronic controller is between two power subunits of the first power module 10.

For example, an interface that is in the motor interface 77 and that is configured to connect to the three-phase line of the motor 90 may be connected to a position point between two power subunits of the first power module 10.

The second power module 20 may also include two power subunits. The power subunit of the second power module 20 includes a diode and a triode, where two ends of the diode are respectively connected between a collector and an emitter of the triode. In the embodiment shown in FIG. 1, the second power module 20 includes a seventh power subunit and an eighth power subunit. The seventh power subunit includes a seventh diode D7 and a seventh triode V7. The eighth power subunit includes an eighth diode D8 and an eighth triode V8.

As shown in FIG. 2, a connecting point of a neutral line of the motor 90 connected to the electronic controller is between two power subunits of the first power module 10.

An interface that is in the motor interface 77 and that is configured to connect to the neutral line of the motor 90 may be connected to a position point between the seventh power subunit and the eighth power subunit of the second power module 20.

By connecting the first capacitor 30 in parallel to the second power module 20, the first capacitor 30, as an absorbing capacitor, may be configured to perform voltage stabilization and absorb a ripple current under a heating condition.

Figure 3:
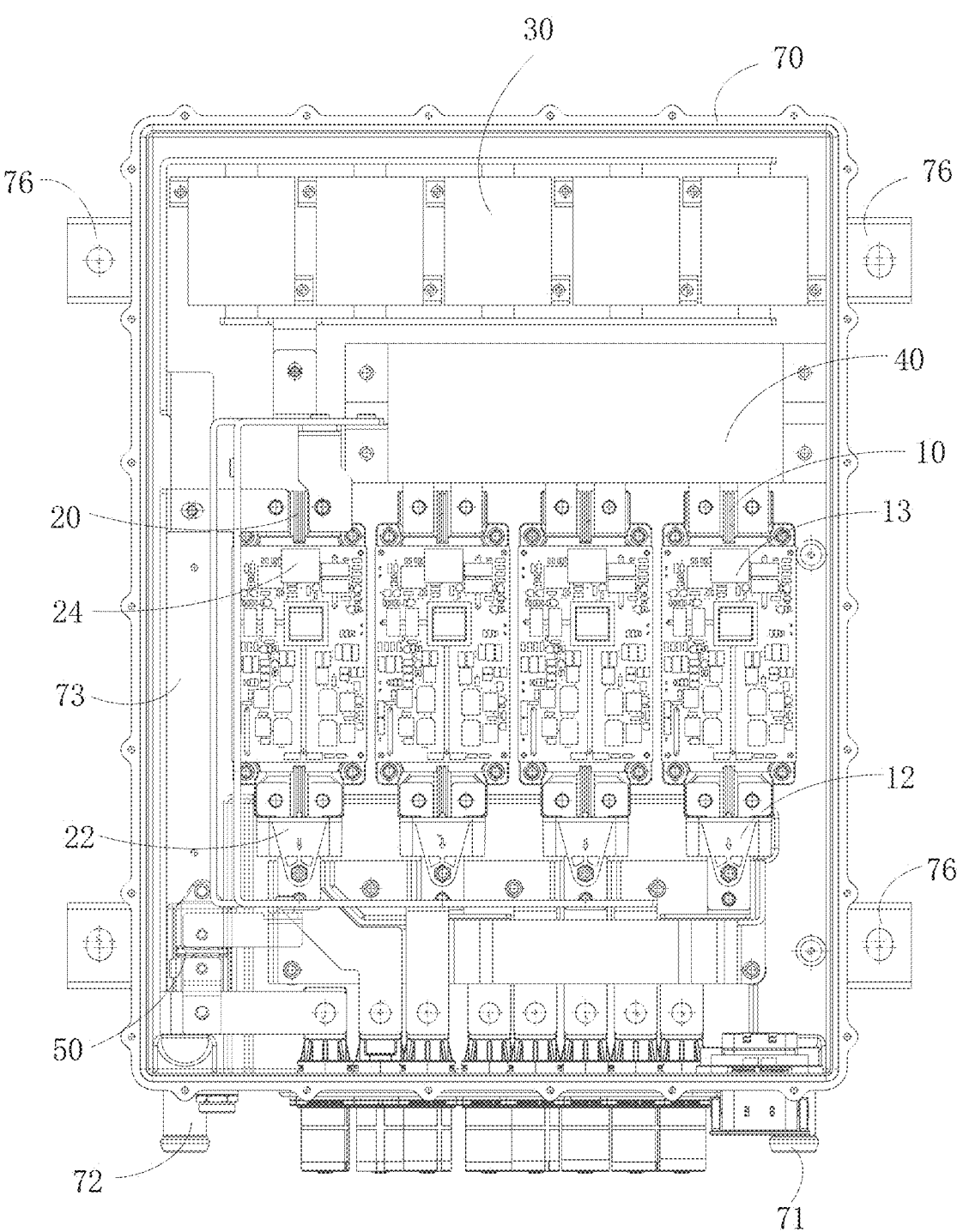
FIG. 3 is a schematic diagram of one structure of a motor controller according to an embodiment of this application.

In this embodiment of this application, referring to FIG. 3, the motor controller may further include a plurality of first current sensors 12 and a second current sensor 22.

The first current sensors 12 are configured to connect to the first power modules 10. For example, the first current sensors 12 may be connected to output ends of the first power modules 10.

The second current sensor 22 is configured to connect to the second power module 20. The second current sensor 22 may be connected to an output end of the second power module.

In this embodiment, a quantity of the first current sensors 12 may be the same as a quantity of the first power modules 10. In the embodiment shown in FIG. 3, the motor controller includes three first power modules 10. Only one of the first power modules 10 is signed in the figure, and the other two first power modules 10 are located between the first power module 10 that is signed and the second power module 20. In the embodiment shown in FIG. 3, the motor controller includes three first current sensors 12. Only one of the first current sensors 12 is signed in the figure, and the other two first current sensors 12 are located between the first current sensor 12 that is signed and the second current sensor 22.

By matching current sensors for power modules, current statuses of the power modules during operation can be detected by using the current sensors, to better pay attention to operation of the motor controller.

In this embodiment of this application, referring to FIG. 3, the motor controller may further include a plurality of first drive boards 13 and a second drive board 24.

Each of the first drive boards 13 may be connected to one of the first power module 10. The second drive board 24 is connected to the second power module 20.

In this embodiment, a quantity of the first drive boards 13 may be the same as a quantity of the first power modules 10. In the embodiment shown in FIG. 3, the motor controller includes three first drive boards 13. Only one of the first drive boards 13 is signed in the figure, and the other two first drive boards 13 are located between the first drive board 13 that is signed and the second drive board 24.

For example, as shown in FIG. 3, the first drive board 13 may be arranged between the first power module 10 and the first current sensor 12. For example, the second drive board 24 may be arranged between the second power module 20 and the second current sensor 22.

For different scenarios, it may be necessary to heat a single group of batteries, or it may be necessary to heat two or more groups of cells. To enable the motor controller to better satisfy requirements of different scenarios, a switch 50 may be arranged in the motor controller, and the motor controller can be switched between a single branch and two branches by using the switch 50.

In an implementation, referring to FIG. 1 again, the motor controller may further include a switch 50.

Two ends of the switch 50 are respectively connected to a first end of the first group of connecting interfaces 11 and a first end of the second group of connecting interfaces 21.

When the switch 50 is in a closed state, the second power module 20 and the plurality of first power modules 10 are in a parallel-connected state.

For example, first ends of the first power modules 10 may be interconnected to form a first end of the plurality of first power modules 10 connected in parallel, and second ends of the first power modules 10 may be interconnected to form a second end of the plurality of first power modules 10 connected in parallel.

For example, the first group of connecting interfaces 11 may include two interfaces, and the second group of connecting interfaces 21 may also include two interfaces. The two interfaces in the first group of connecting interfaces 11 may be respectively arranged at the first end of the plurality of first power modules 10 connected in parallel and the second end of the plurality of first power modules 10 connected in parallel. The two interfaces in the second group of connecting interfaces 21 may be respectively arranged at the first end of the first power modules 10 and a second end of the second power module 20.

A first end of the second power module 20 is connected to the first end of the plurality of first power modules 10 connected in parallel, and two ends of the switch 50 are respectively connected to the second end of the second power module 20 and the second end of the plurality of first power modules 10 connected in parallel.

When the switch 50 is closed, the second end of the second power module 20 and the second end of the plurality of first power modules 10 connected in parallel may be interconnected, so that the second power module 20 and the plurality of first power modules 10 can be connected in parallel.

In this embodiment, when the switch 50 is closed, in a case that the second power module 20 and the plurality of first power modules 10 form a parallel-connected state, the motor controller can form a single-branch working state, and may be connected to a group of batteries by the first group of connecting interfaces 11, to provide heating for the group of batteries. When the switch 50 is open, and the second power module 20 and the plurality of first power modules 10 are in a non-parallel-connected state, two independent branches can be formed, and the motor controller can form a two-branch working state, and may be connected to a group of batteries by the first group of connecting interfaces 11 and a group of batteries by the second group of connecting interfaces 21 respectively, to provide heating for the two groups of batteries.

In another implementation, the motor controller further includes: an electric connector 60 that is detachably installed on a first end of the first group of connecting interfaces 11 and that is connected to a first end of the second group of connecting interfaces 21.

Figure 5:
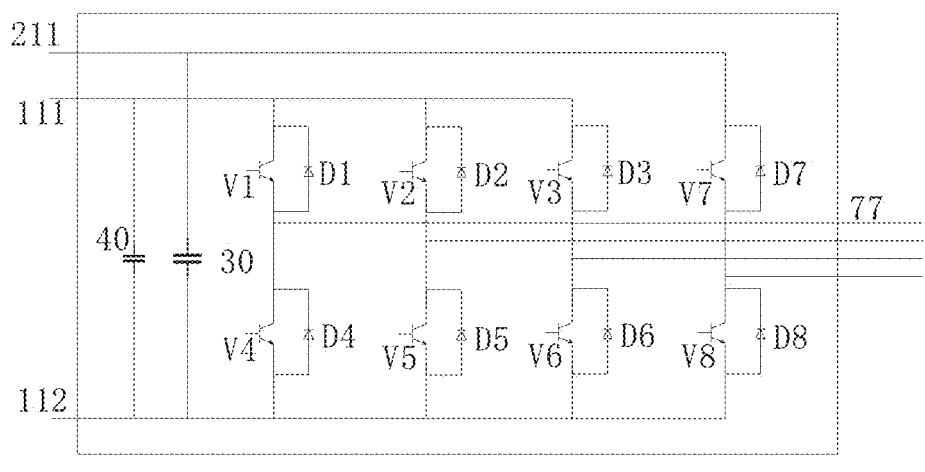
FIG. 5 is another schematic diagram of another structure of a motor controller according to an embodiment of this application.
Figure 6:
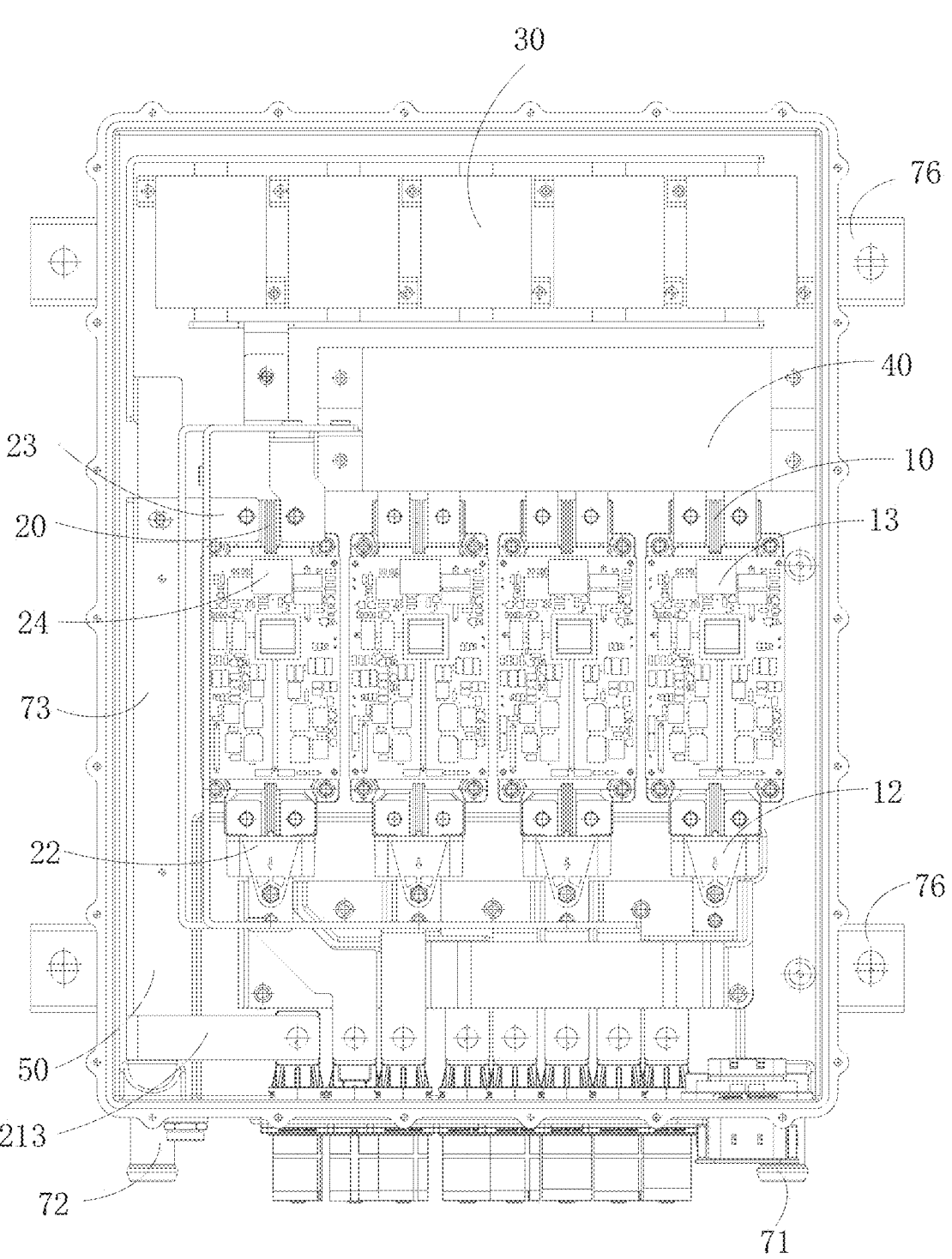
FIG. 6 is a schematic diagram of a structure of the motor controller shown in FIG. 5 in another state.

As shown in FIG. 4 to FIG. 6, FIG. 4 is a schematic diagram of another circuit structure of a motor controller according to an embodiment of this application, and FIG. 5 and FIG. 6 are schematic diagrams of another structure of a motor controller according to an embodiment of the present application. The embodiment shown in FIG. 5 is an example in which two branches can be implemented when the electric connector 60 is not installed on the motor controller, to provide heating for two groups of batteries The embodiment shown in FIG. 6 is an example in which a single branch can be implemented when the electric connector 60 is installed on the motor controller, to provide heating for a group of batteries.

When the electric connector 60 is installed at a connection between the first end of the first group of connecting interfaces 11 and the first end of the second group of connecting interfaces 21, the second power module 20 and the plurality of first power modules 10 are in a parallel-connected state.

For example, two ends of the electric connector 60 may be respectively connected to the second end of the second power module 20 and the second end of the plurality of first power modules 10 connected in parallel.

Figure 7:
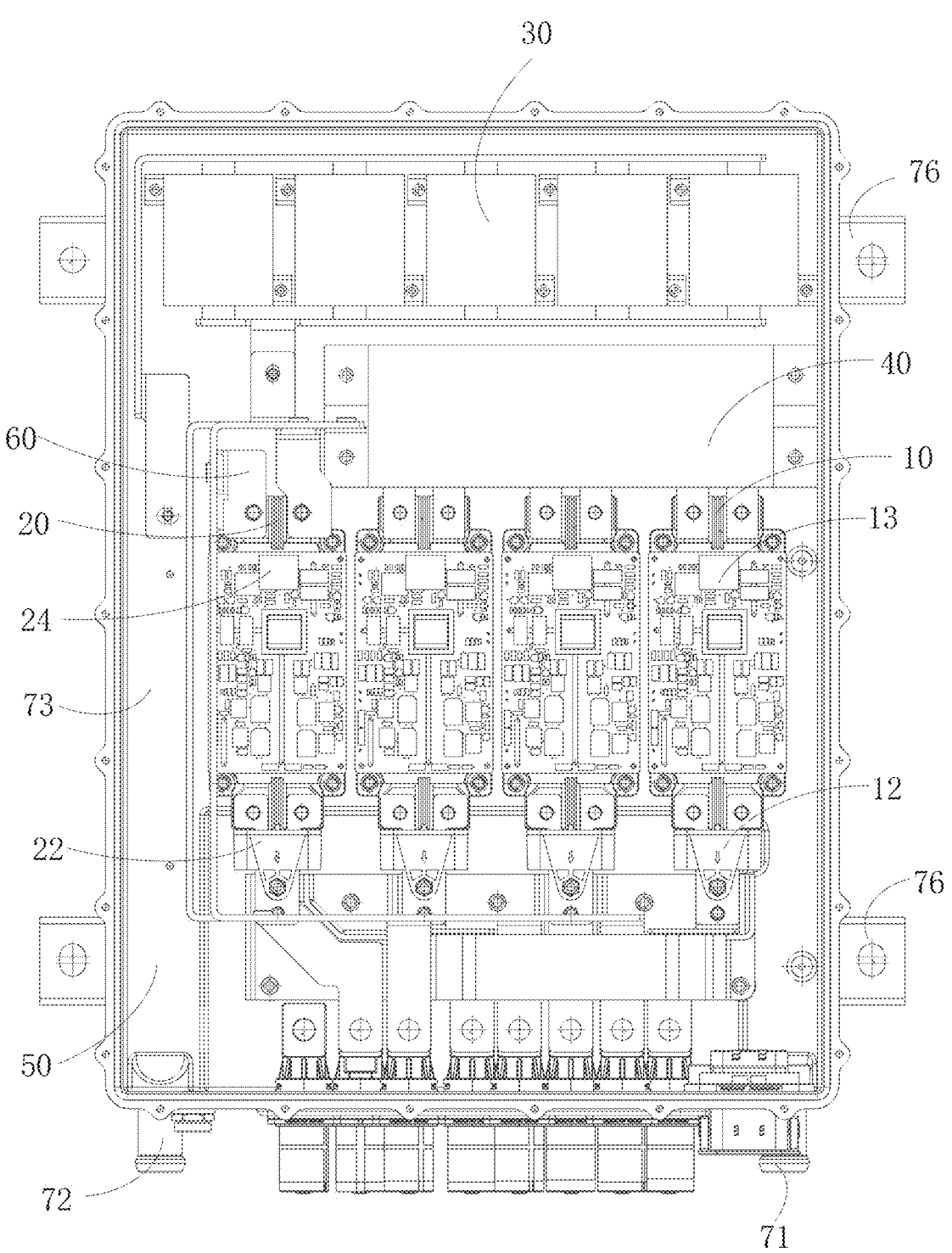
FIG. 7 is a schematic diagram of the motor controller shown in FIG. 3 from another angle.

As shown in FIG. 7, when the electric connector 60 is installed at a connection between the first end of the first group of connecting interfaces 11 and the first end of the second group of connecting interfaces 21, the second end of the second power module 20 and the second end of the plurality of first power modules 10 connected in parallel may be interconnected, so that the second power module 20 and the plurality of first power modules 10 can be connected in parallel.

As shown in FIG. 6, when the electric connector 60 connected to the first end of the first group of connecting interfaces 11 and the first end of the second group of connecting interfaces 21 is removed, the second end of the second power module 20 and the second end of the plurality of first power modules 10 connected in parallel may be interconnected, so that the second power module 20 and the plurality of first power modules 10 can be connected in parallel.

In this embodiment, when the electric connector 60 is installed at a connection between the first end of the first group of connecting interfaces 11 and the first end of the second group of connecting interfaces 21, and the second power module 20 and the plurality of first power modules 10 form a parallel-connected state, the motor controller can form a single-branch working state, and may be connected to a group of batteries by the first group of connecting interfaces 11, to provide heating for the group of batteries. When the electric connector 60 is removed from a connection between the first end of the first group of connecting interfaces 11 and the first end of the second group of connecting interfaces 21, and the second power module 20 and the plurality of first power modules 10 are in a non-parallel-connected state, two independent branches can be formed, and the motor controller can form a two-branch working state, and may be connected to a group of batteries by the first group of connecting interfaces 11 and a group of batteries by the second group of connecting interfaces 21 respectively, to provide heating for the two groups of batteries.

For example, in actual use, an electric connector may be installed at an input position of the second power module by removing a second positive-electrode output electric connector 213 and a module input electric connector 23 in FIG. 5, and a positive electrode of a fourth power module is connected in parallel to an electric connector position of the first positive electrode interface 111 of the first group of connecting interfaces 11, so that the second power module 20 and the plurality of first power modules 10 form a parallel-connected state, thereby switching from a two-branch solution to a single-branch solution.

In actual use, the battery can be heated through a single branch or two branches of the motor controller according to specific heating requirements. For example, when faster or more efficient heating is required, the battery can be heated through two branches. In another example, when a requirement on heating efficiency is not high, the battery can be heated through a single branch.

Referring to FIG. 1 again, the motor controller may further include a second capacitor 40 connected in parallel to the first power module 10. The second capacitor 40 may be used as a busbar capacitor of the motor controller.

As shown in FIG. 3, the motor controller may further include a box body 70.

The box body 70 may be configured to accommodate the plurality of first power modules 10, the second power module 20, and the first capacitor 30.

As shown in FIG. 4, the first group of connecting interfaces 11 and the second group of connecting interfaces 21 may be arranged on a side surface of the box body 70.

The box body 70 is provided with a coolant outlet 71, a coolant inlet 72, and a coolant channel 73 communicating the coolant outlet 71 with the coolant inlet 72.

As shown in FIG. 7, FIG. 7 is a schematic diagram of the motor controller shown in FIG. 3 from another angle. The coolant outlet 71 and the coolant inlet 72 on the box body 70 may be arranged at two positions on a surface of the box body 70 shown in FIG. 7.

In this embodiment, referring to FIG. 3, the first power modules 10, the second power module 20, the first group of connecting interfaces 11, the second group of connecting interfaces 21, and the first capacitor 30 are installed inside the box body 70.

The first power modules 10 and the second power module 20 are configured to perform heat exchange with a coolant in the coolant channel 73.

When a coolant enters the coolant channel 73 through the coolant inlet 72, a temperature of the coolant is low, and a temperature difference between the coolant and the first power modules 10 is large. The coolant can be used to dissipate heat from the second power module 20 first, and then from the plurality of first power modules 10, so that the heat dissipation effect of the motor controller is improved.

Optionally, the motor controller may further include a third group of connecting interfaces 80, arranged on a side surface of the box body 70, where the third group of connecting interfaces 80 are connected to the plurality of first power modules 10 and the second power module 20. The third group of connecting interfaces 80 are configured to connect to the motor.

For example, as shown in FIG. 3, the third group of connecting interfaces 80 may alternatively be arranged on a side surface on which the first group of connecting interfaces 11 and the second group of connecting interfaces 21 are located. The third group of connecting interfaces 80 includes three multi-phase interfaces (U, V, and W) and one neutral-line interface (Z).

In this embodiment, the motor controller may further include a box cover (not shown in the figure) matching the box body and snap-fitted onto the box body 70. An electromagnetic shielding seal gasket may be arranged at a position at which the box body 70 and the box cover are snap-fitted. By arranging the electromagnetic shielding seal gasket at the position at which the box body 70 and the box cover are snap-fitted, the electromagnetic shielding seal gasket can further improve electromagnetic compatibility of the motor controller while satisfying waterproofing performance requirements.

In this embodiment, referring to FIG. 7 again, an explosion-proof valve 74 and a low-pressure interface 75 may be further arranged on the box body 70. Optionally, as shown in FIG. 3, a connecting portion 76 may be further arranged on the box body 70. The motor controller may be installed at a required position by using the connecting portion 76. In the embodiment shown in FIG. 3, four connecting portions 76 are arranged on the box body 70. The motor controller may be installed at a required position by using the four connecting portions 76.

For example, the motor controller may be installed at any desired position through cooperation between a fastener and the connecting portion 76. For example, the fastener may be a bolt, a nut, or the like.

A structure of the motor controller provided in this embodiment of this application has features such as being compact, a high space utilization, a low weight, and low costs. Further, the motor controller can be connected to a three-phase line and a neutral line of the motor, to implement mutual excitation and self-heating functions between two groups of batteries. Moreover, after a neutral connecting line of the motor is connected, currents in a same direction can be carried in three phases of the motor, so that a problem of noise of the motor and a problem of over-temperature demagnetization of a rotor can be alleviated. A magnitude of a heating current is affected by a peak current on a side of the motor, so that noise can be reduced, and a heating power can be increased. Further, implementing switching between a single branch and two branches through a switch or an electric connector to achieve a solution being compatible with heating the battery through both a single branch and two branches can satisfy requirements of different scenarios.

An embodiment of this application further provides a drive system. The drive system may include a motor 90 and a motor controller.

For a diagram of a circuit structure of the drive system, reference may be made to the foregoing example shown in FIG. 2.

The motor controller in this embodiment is similar to the foregoing motor controller. For other details of the motor controller in this embodiment, reference may be made to the descriptions in the embodiment of the foregoing motor controller, and details are not described herein again.

An embodiment of this application further provides a power supply system. The power supply system may include a battery and a drive system.

The drive system in this embodiment is similar to the foregoing drive system. For other details of the drive system in this embodiment, reference may be made to the descriptions in the embodiment of the foregoing drive system, and details are not described herein again.

The foregoing descriptions are merely preferred embodiments of this application, but are not intended to limit this application. For a person skilled in the art, this application may have various modifications and changes. Any modification, equivalent replacement, or improvement made without departing from the spirit and principle of this application shall fall within the protection scope of this application. It should be noted that similar reference signs and letters indicate similar items in the following drawings, and therefore once an item is defined in one drawing, it does not need to be further defined and explained in the subsequent drawings.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A motor controller, comprising: a plurality of first power modules, a second power module, a first group of connecting interfaces, a second group of connecting interfaces, and a first capacitor, wherein the plurality of first power modules are connected in parallel to each other, and the plurality of first power modules are configured to connect to the first group of connecting interfaces;

the second power module is configured to connect to the second group of connecting interfaces; and the first capacitor is connected in parallel to the second power module, wherein the plurality of first power modules and the second power module are configured to perform temperature regulation on an object connected to the first group of connecting interfaces and the second group of connecting interfaces;

each of the first power modules includes two first power subunits connected in series, each of the two first power subunits includes a first diode and a first triode, where two ends of the first diode are respectively connected between a collector and an emitter of the first triode;

the second power module includes two second power subunits, each of the two second power subunits includes a second diode and a second triode, where two ends of the second diode are respectively connected between a collector and an emitter of the second triode; and the motor controller further comprises a switch, wherein two ends of the switch are respectively connected to the first group of connecting interfaces and the second group of connecting interfaces, wherein when the switch is in a closed state, the second power module and the plurality of first power modules are in a parallel-connected state.

2. The motor controller according to claim 1, further comprising: a plurality of first current sensors and a second current sensor, wherein the first current sensors are connected to output ends of the first power modules; and the second current sensor is connected to an output end of the second power module.

3. The motor controller according to claim 1, further comprising: a plurality of first drive boards and a second drive board, wherein each of the first drive boards is connected to one of the first power modules; and the second drive board is connected to the second power module.

4. The motor controller according to claim 1, further comprising:

an electric connector that is detachably installed on a first end of the first group of connecting interfaces and that is connected to a first end of the second group of connecting interfaces.

5. The motor controller according to claim 1, comprising three of the first power modules, wherein three plurality of first power modules are respectively configured to connect to a three-phase line of a motor; and the second power module is configured to connect to a neutral line of the motor.

6. The motor controller according to claim 1, further comprising a second capacitor connected in parallel to the first power modules.

7. The motor controller according to claim 1, further comprising a box body, wherein the box body is configured to accommodate the plurality of first power modules, the second power module, and the first capacitor; and the first group of connecting interfaces and the second group of connecting interfaces are arranged on a side surface of the box body.

8. The motor controller according to claim 7, wherein the box body is provided with a coolant outlet, a coolant inlet, and a coolant channel communicating the coolant outlet with the coolant inlet, wherein the first power modules and the second power module are configured to perform heat exchange with a coolant in the coolant channel.

9. The motor controller according to claim 7, further comprising: a third group of connecting interfaces, arranged on a side surface of the box body, wherein the third group of connecting interfaces are connected to the plurality of first power modules and the second power module; and the third group of connecting interfaces are configured to connect to the motor.

10. The motor controller according to claim 9, wherein the first group of connecting interfaces, the second group of connecting interfaces, and the third group of connecting interfaces are arranged on a same side surface of the box body.

11. The motor controller according to claim 7, further comprising: a box cover matching the box body and snap-fitted onto the box body, wherein an electromagnetic shielding seal gasket is arranged at a position at which the box body and the box cover are snap-fitted.

12. A drive system, comprising a motor and the motor controller according to claim 1.

13. A power supply system, comprising a battery and the drive system according to claim 12.

14. An electric device, comprising the power supply system according to claim 13.

* * * * *